(12) United States Patent
Lomnitz (10) Patent No.: US 10,771,170 B2
(45) Date of Patent: Sep. 8, 2020

(54) REAL-TIME NETWORK ANALYZER AND APPLICATIONS

(71) Applicant: VAYYAR IMAGING LTD., Yehud (IL)

(72) Inventor: Yuval Lomnitz, Yehud (IL)

(73) Assignee: VAYYAR IMAGING LTD., Yehud (IL)

( * ) Notice: Subject to any disclaimer, the term of this patent is extended or adjusted under 35 U.S.C. 154(b) by 0 days.

(21) Appl. No.: 16/426,726

(22) Filed: May 30, 2019

(65) Prior Publication Data

US 2019/0280787 A1  Sep. 12, 2019

Related U.S. Application Data

(63) Continuation of application No. 15/838,815, filed on Dec. 12, 2017, now Pat. No. 10,320,499, which is a continuation of application No. 15/404,997, filed on Jan. 12, 2017, now Pat. No. 9,876,590, which is a continuation-in-part of application No. 15/226,865, filed on Aug. 2, 2016, now abandoned.

(60) Provisional application No. 62/200,079, filed on Aug. 2, 2015.

(51) Int. Cl.
*H04B 1/10* (2006.01)
*H04B 17/309* (2015.01)
*H04B 1/00* (2006.01)

(52) U.S. Cl.
CPC ......... *H04B 17/309* (2015.01); *H04B 1/0092* (2013.01); *H04B 1/1018* (2013.01)

(58) Field of Classification Search
CPC ............................ H04B 17/309; H04B 1/0092
See application file for complete search history.

(56) References Cited

U.S. PATENT DOCUMENTS

| | | |
|---|---|---|
| 2,735,070 A | 2/1956 | Riblet |
| 4,211,911 A | 7/1980 | Dehn |
| 4,626,805 A | 12/1986 | Jones |
| 5,039,824 A | 8/1991 | Takashima |
| 5,389,735 A | 2/1995 | Bockelman |
| 5,572,160 A | 11/1996 | Wadell |
| 5,774,801 A | 6/1998 | Li et al. |
| 5,825,820 A * | 10/1998 | Urabe ............... H03G 3/3047 375/259 |
| 6,636,816 B1 | 10/2003 | Dvorak et al. |
| 7,034,548 B2 | 4/2006 | Anderson et al. |

(Continued)

OTHER PUBLICATIONS

P. Lombardini et al., "Criteria for the Design of Loop-Type 12 Directional Couplers for the L Band" (1956).

*Primary Examiner* — Tuan H Nguyen
(74) *Attorney, Agent, or Firm* — Browdy and Neimark, PLLC (57) ABSTRACT

A device for generating a frequency-up-converted wideband signal, the device including a periodic address counter connected to a waveform memory to generate two digital signals, two digital to analog converters configured to convert the two digital signals to two analog signals, two filters connected to the two digital to analog converters configured to anti-alias filter the two analog signals and a quadrature modulator connected to the two filters and to an oscillator for generating the frequency-up-converted wideband signal. A method for generating a frequency-up-converted wideband signal is also provided.

13 Claims, 5 Drawing Sheets

(56) References Cited

U.S. PATENT DOCUMENTS

| | | |
|---|---|---|
| 7,148,702 B2 | 12/2006 | Wong et al. |
| 7,448,880 B2 | 11/2008 | Osaka |
| 8,494,615 B2 | 7/2013 | Melamed et al. |
| 8,620,238 B2 | 12/2013 | Chan et al. |
| 2003/0198304 A1 | 10/2003 | Sugar et al. |
| 2012/0281550 A1* | 11/2012 | Huang ............... H04B 1/0475 370/249 |
| 2013/0003889 A1* | 1/2013 | Earls ................. H04B 17/11 375/296 |
| 2013/0049877 A1* | 2/2013 | Lozhkin ............. H03F 1/0294 332/103 |
| 2013/0303866 A1 | 11/2013 | Fischer |
| 2014/0051347 A1 | 2/2014 | Ling |

* cited by examiner

REAL-TIME NETWORK ANALYZER AND APPLICATIONS

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Network analyzers are an essential tool for characterizing radio frequency devices. Network analyzers are often embedded into systems for characterizing antennas, radar cross section, propagation paths, materials sensors etc. The common structure of a network analyzer is a frequency-stepped signal source, multiple receivers, where at least one of the multiple receivers measures a reference signal, and at least one of the receivers simultaneously measures a signal arriving from a device under test (DUT). The dwell time on each frequency depends on the amount of signal averaging desired, affecting the measurement accuracy and sensitivity, and it is reflected in a "IF bandwidth" or "resolution bandwidth" parameter. The number of frequencies over which the sweep is performed affects the overall sweep time.

The DUT parameters are usually assumed to remain constant throughout the sweep time. In most applications this does not pose a limitation, such as when characterizing passive networks, e.g. filters. However, in many cases, the network parameters change over time. For example, antenna may rotate in an antenna range. An amplifier may warm up and change its characteristics after turn-on. Material under test may move on a conveyor belt or in a pipe, each time bringing in a new sample. A patient may breathe or move during examination in a medical microwave imaging system. An indoor propagation path may vary due to plasma discharge buildup and decay in a fluorescent lamp. In such cases, long acquisition time poses a limitation. It is, therefore, desirable to have a network analyzer with a substantially shorter acquisition time, capable of characterizing networks and devices in real time.

In some applications network parameters vary over time in a manner that precludes the use of conventional swept frequency network analyzers. Swept measurements incur penalty both in terms of acquisition time, and in terms of registration between measurements taken at the beginning and at the end of a sweep.

SUMMARY OF INVENTION

According to a first aspect of the invention there is provided a real time network analyzer, comprising: at least one generator configured and operable to produce a wideband time periodic signal; a plurality of receivers operably connected to the at least one generator to receive the wideband time periodic signal, wherein each of said plurality of receivers comprises: a wideband sampling data converter configured and operable to sample and convert the received wideband time periodic signal to digital data; a frequency response calculation unit configured and operable to convert the digital data to a frequency domain signal; and a network parameters calculating unit configured and operable to process the digital data to calculate network parameters.

In an embodiment, the network analyzer is configured to: sample at least two wideband signals of the network analyzer, wherein a first signal of said at least two is a reference signal and the other signals are one or more incoming signals; and compute the ratio of Fourier coefficients between the first signal and the other signals to yield said network parameters.

In an embodiment, the wideband periodic signal spectrum covers all the frequency range of interest.

In an embodiment, the wideband periodic signal is a multi-tone signal.

In an embodiment, the wideband sampling data converter is a sub-sampling data converter.

In an embodiment, the frequency response calculation unit is a Fourier transform processor.

In an embodiment, the network analyzer is a vector network analyzer (VNA).

In an embodiment, the network analyzer comprises a transmitterconfigured and operable to generate a wideband signal at an appropriate frequency and with time periodicity T1.

In an embodiment, the network analyzer comprises a local oscillator configured and operable to generate a wideband signal at an appropriate frequency and with time periodicity T2 for down-conversion of a plurality of signals.

In an embodiment, the network analyzer comprises: a correlator unit configured and operable to receive the digital data and correlate the digital data with a template waveform and an impulse response extraction unit connected to the correlator configured and operable to compute the time domain impulse response.

According to a second aspect of the invention there is provided a method for processing a wideband signal, the method comprising: sampling and converting said wideband signal to digital data by a wideband sampling data converter, storing at least one period of said digital data in a non-transitory storage memory; and converting the at least one period of said digital data to frequency domain by a Fourier transform processor.

In an embodiment the method further comprising: sampling at least two wideband signals of the network analyzer, said at least two wideband signals comprising a reference signal and the other signals are one or more incoming sampled signals; and computing a ratio of Fourier coefficients between the first signal and the one or more incoming sampled signals to yield said network parameters.

In an embodiment, said parameters are Scattering parameters.

In an embodiment, the method further comprising reducing the processed signal bandwidth.

In an embodiment, the wideband sampling data converter is a sub-sampling data converter configured and operable to reduce the processed signal bandwidth.

In an embodiment, the method further comprising: performing a Fourier transform to obtain Fourier transform coefficients; and reordering the Fourier transform coefficients by a deinterleaver for further processing.

In an embodiment, the method further comprising deinterleaving the time domain sub-samples of said signals into an order which represents the sequential order of the wideband samples signal; and converting the deinterleaved signal to frequency domain by using a Fourier transform.

In an embodiment, reducing said processed signal bandwidth comprises using a wideband baseband signal as a local oscillator of a receiver frequency down-converter.

In an embodiment, the wideband generated signal is a multi-tone "comb" like signal, covering typically all the band of interest. The received signals are processed typically over a single (or few) time periods, thus enabling real time evaluation of DUT parameters.

In an embodiment the wideband sampling data converter is replaced by a sub-sampling data converter, thus reducing the processed signal bandwidth.

In an embodiment the network analyzer is a vector network analyzer (VNA).

According to a second aspect of the present invention there is provided a real time network analyzer, comprising: a wideband signal generator; a plurality of receivers comprising: a wideband sampling data converter; a correlator of the received sampled signal with a template; an impulse response extraction unit; a frequency response calculation unit; and a network parameter calculating unit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system.

In an exemplary embodiment of the invention, one or more tasks according to exemplary embodiments of method and/or system as described herein, are performed by a data processor, such as a computing platform for executing a plurality of instructions.

Optionally, the data processor includes a non-transitory volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

The configurations disclosed herein can be combined in one or more of many ways to provide an improved network analyzer for real-time analysis of network parameters. In accordance with the description herein, examples include configurations ranging from thermal drift of amplifiers, to microwave imaging of moving objects, characterizing materials on conveyors, characterizing plasma buildup, and many more.

The methods and apparatus disclosed herein can be incorporated with components from network analyzers known in the art, such as network analyzer described in U.S. patent application Ser. No. 14/605,084 entitled "VECTOR NETWORK ANALYZER", the entire disclosures of which are incorporated herein by reference.

Use of a wideband signal (instead of, for example, a swept signal), allows instantaneous, i.e. real time measurement and characterization of the DUT network parameters. A single period of the received signal waveform is adequate for this. However, if longer acquisition time is permitted, multiple periods of the signal waveform may be averaged in order to improve the signal-to-noise ratio. For example, a multi-tone 1-3 GHz "comb" signal of 200 sub-carriers equally spaced by 10 MHz has a time period of 100 ns, thus acquisition time is of the order of 100 ns; signals over several periods of 100 ns each may be averaged.

In some cases, the multi-tone signals may have large peak-to-average ratio, thus potentially harming the efficiency of the source drive amplifiers. It is therefore preferable to use well-designed signal waveforms having small peak-to-average ratio. Such signal waveforms are well known in the art, e.g. chirp waveforms and complementary sequences.

Furthermore, the proposed multi-tone signals may be compressed in a controlled or uncontrolled way (e.g. by the power amplifier) without affecting operation. This is because, even after compression, the signal remains still a multi-tone signal, however with different amplitudes and phases, and perhaps some spectral growth. The amplitudes and phases generated by compression may be compensated for example by comparison with, or division by, the said reference signal.

The time period of the instantaneous wideband signal waveform can be adapted to the time scale of the variations that need to be characterized. For fast phenomena, a shorter time period can be used. As a consequence, assuming a multi-tone "comb" signal, the frequency comb will have lower density of spectral lines. For example, a 100 ns multi-tone signal has a comb spacing of 10 MHz while a 50 ns signal has a comb spacing of 20 MHz.

In some applications, a non-equally spaced transmitted multi-tone may be used in order to reduce the effect of inter-modulations.

Modern data converters allow generating and sampling waveforms in the GHz range. This means that the instantaneous bandwidth of a real-time network analyzer based on the proposed methods and systems can be in a range of few GHz. There is a recurring tradeoff between the sampling frequency and resolution. For example, use of a periodic waveform 100 nsec long will allow measurements over a 10 MHz grid. Use of a waveform 1 microsecond long will allow 1 MHz grid, at the expense of time resolution.

Figure 1:
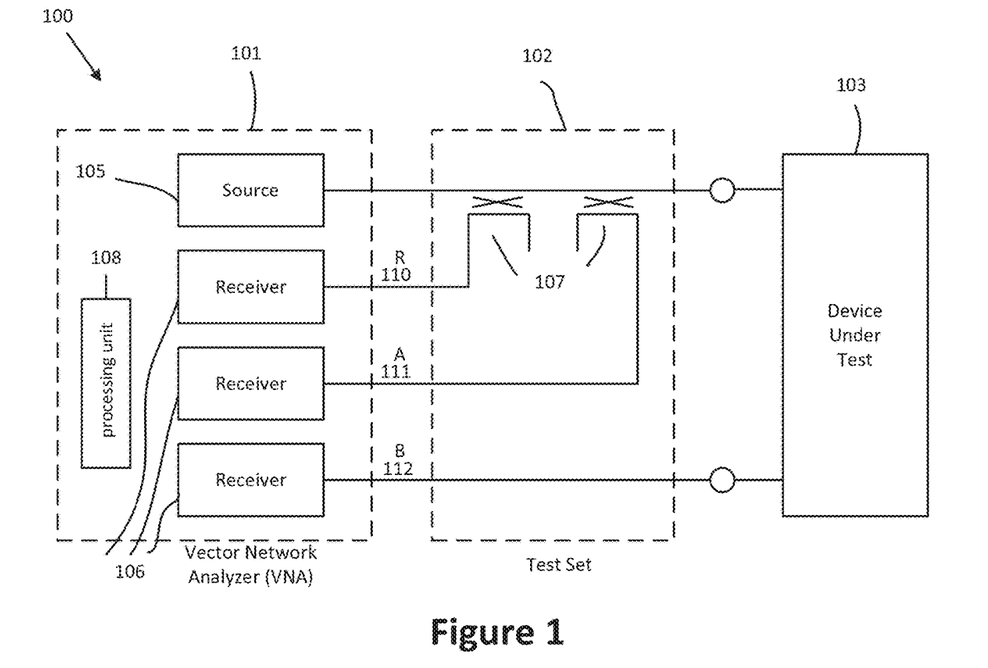
FIG. 1 is a simplified block diagram showing a set-up of an exemplary 2-port Network Analyzer system connected to a device under test, in accordance with embodiments.

Reference is made to FIG. 1 illustrating a set-up for measuring and analyzing in real time parameters of a network, in accordance with embodiment of the disclosed subject matter. The Network Analyzer (101) comprises at least one signal generator (105) for signal generation and at least one receiver channel (106) for signal acquisition and measurement. The measurements are obtained by a processing or calculating unit (108) configured to calculate the network parameters. A Real Time Network Analyzer implementation according to some embodiments further includes a test set (102) comprising one or more bridges (107) and multiple receiver channels (106) to allow simultaneous acquisition and measurement of network parameters of a device under test (103).

In some embodiments, the processing unit includes one or more hardware central processing units (CPU) that carry out the device's functions. In still further embodiments, the digital processing unit further comprises an operating system configured to perform executable instructions. In some embodiments, the processing unit is optionally connected a computer network. In further embodiments, the processing unit is optionally connected to the Internet such that it accesses the World Wide Web. In still further embodiments, the processing unit is optionally connected to a cloud computing infrastructure. In other embodiments, the processing unit is optionally connected to an intranet. In other embodiments, the processing unit is optionally connected to a data storage device.

In some embodiments, the processing unit includes one or more non-transitory computer readable storage media encoded with a program including instructions executable by the operating system of an optionally networked digital processing device. In further embodiments, a non-transitory computer readable storage medium is a tangible component of a digital processing device.

In accordance with some embodiments, the continuous-wave (CW) signal source of a network analyzer, which is typically swept over a frequency range of interest, is replaced with an instantaneous wideband signal source, preferably covering instantaneously all the frequency range of interest. The wideband signal source preferably generates a multi-tone "comb" of equally spaced sub-carrier frequencies, resulting in a periodic time-domain signal. For example, to cover the 1-3 GHz frequency band of interest (i.e. the band to be analyzed), a multi-tone "comb" signal of 200 sub-carriers equally spaced by 10 MHz, with the lowest frequency at 1 GHz and time period of 100 ns is generated.

Figure 2A:
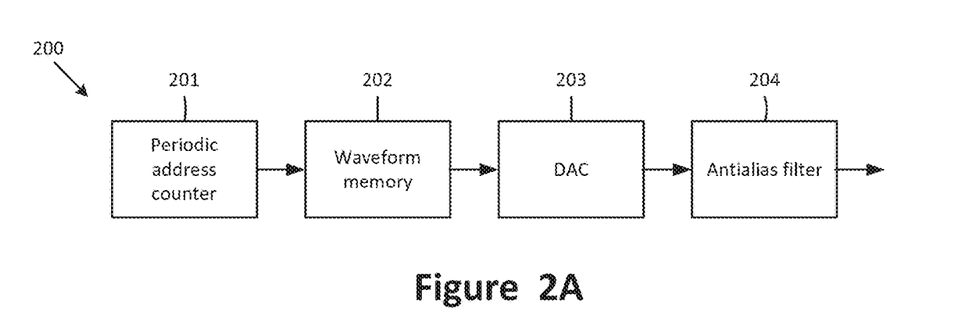
FIG. 2A illustrates generation of a periodic baseband signal, in accordance with embodiments.

Reference is made to FIG. 2A illustrating a method (200) for generating the wideband signal in accordance with some embodiments. The method comprises: using a digital waveform memory (202) which is periodically read out using for example an address counter (201). The resulting digital signal is converted by a digital-to-analog converter (DAC) (203) and filtered, using an antialias filter (204), to suppress aliasing.

Optionally, the wideband signal can be translated to a higher frequency by mixing it with the output of an auxiliary transmit oscillator, using a regular or a quadrature type modulator. This translation is required when the frequency range to be analyzed is at a very high frequency, which cannot be covered directly by the generated wideband signal. For example, to analyze the frequency range of 11-13 GHz, a signal of 1-3 GHz is frequency translated to that range, by mixing it with the output of a 10 GHz auxiliary transmit oscillator.

Figure 2B:
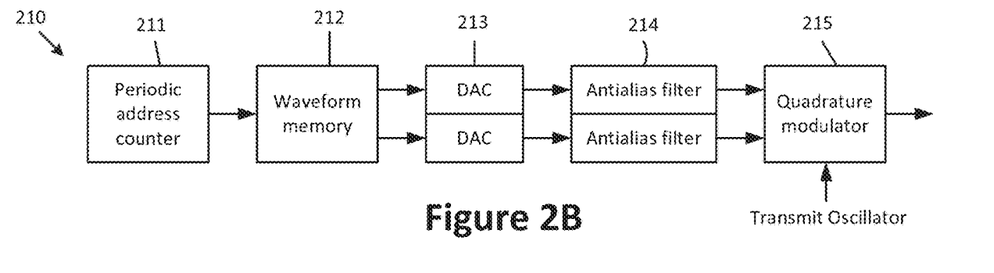
FIG. 2B illustrates generation and frequency up-conversion of a periodic signal frequency, in accordance with embodiments.

Reference is made to FIG. 2B illustrating a method 210 for generating a frequency up-converted wideband signal frequency, in accordance with embodiments.

The method comprises using a digital waveform memory (212) which is periodically read out using for example an address counter (211), generating and outputting two digital signals in quadrature relation one to the other (I/Q). The signals are further converted by the dual digital-to-analog converter (213) and filtered, using dual antialias filters (214), suppress aliasing. The resulting signals output from the filters (214) to a quadrature modulator (215), where they are frequency-up-converted and output as a frequency up-converted wideband signal.

On the receive side, each of the plurality of receivers may down-convert the signal to a wideband baseband, (in case it was up-converted at the transmit stage) by mixing the received signal with the output of an auxiliary receive oscillator, the mixer being of a regular or quadrature mixer type. For example, a received signal of for example 11-13 GHz is frequency down-converted to a 1-3 GHz range or to a different range, e.g. 0-2 GHz, using an auxiliary receive oscillator of frequency 10 GHz or 11 GHz accordingly.

The auxiliary transmit oscillator and the auxiliary receive oscillator may have in some cases the same frequency or different frequencies. For example, frequency offset between the oscillators can be used to avoid upper sideband subcarriers and lower sideband subcarriers folding onto each other during reception.

Figure 3A:
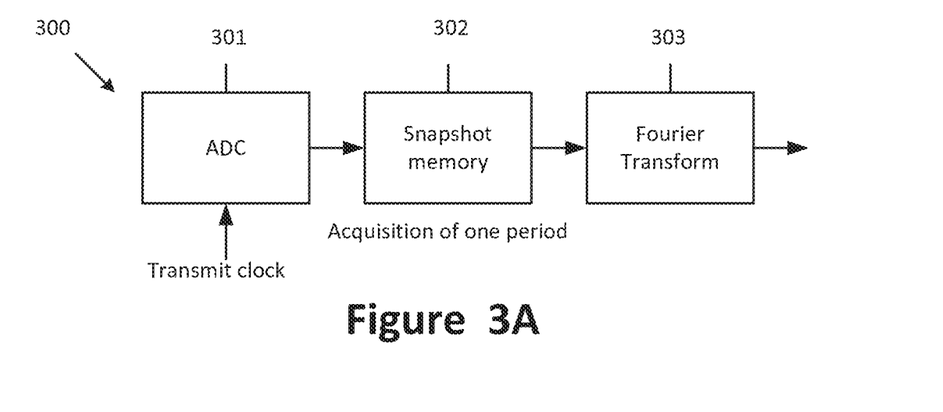
FIG. 3A illustrates a periodic signal analyzing receiver, in accordance with embodiments.
Figure 3B:
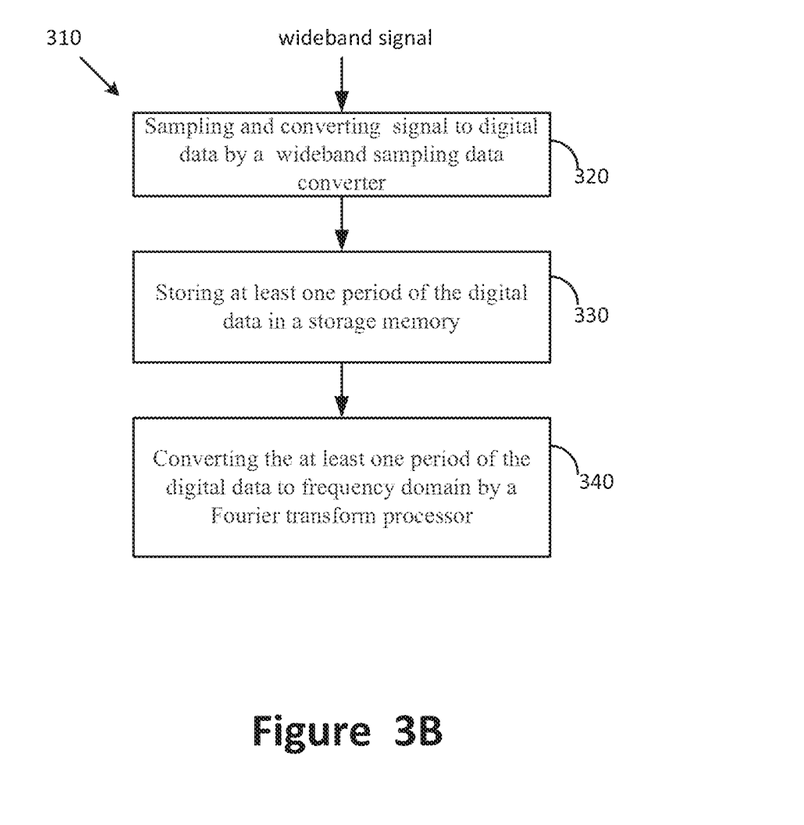
FIG. 3B illustrates a method for real time processing of one or more wideband signals, in accordance with embodiments.

Reference is made to FIGS. 3A and 3B which are high level schematic block diagrams illustrating a periodic signal analyzing receiver (300) of a network analyzer and steps of a method (310) for real time processing one or more wideband signals, in accordance with embodiments.

As illustrated in FIG. 3A, a wideband baseband signal is sampled and converted to digital data using, for example, wideband sampling data converters (301), e.g. wideband analog-to-digital converters (ADCs). At least one period of the signal is stored in a non-transistory storage memory such as a "snapshot" memory (302), and then output to a frequency response calculation unit configured to convert the stored signal to the frequency domain using, for example, a Fourier transform processor (303). In some cases, a Fast Fourier Transform (FFT) algorithm is used, but other numerical methods such as "Chirp Z-transform" (CZT) may be used.

According to some embodiments, for real time network analysis, as schematically illustrated in FIG. 1, a reference signal (110) is received on one channel, and one or more incoming signals (111, 112) from the device under test (DUT) are received on other channels. Computing the ratio of Fourier coefficients between different received channels (e.g. incoming signal-channels (111, 112) versus a reference channel (110)), the relevant network parameters (e.g. the Scattering parameters) at each frequency are calculated by, for example, the processing unit (108).

Reference is made to FIG. 3B illustrating a method (310) for real time processing one or more wideband signals, in accordance with embodiments. Step (320) includes sampling and converting the wideband signal to digital data by for example a wideband sampling data converter. Step (330) includes storing at least one period of the converted wideband signal in a non-transitory storage memory and step (340) includes converting the at least one period of the converted wideband signal to frequency domain by a frequency response calculation unit such as Fourier transform processor.

Figure 4A:
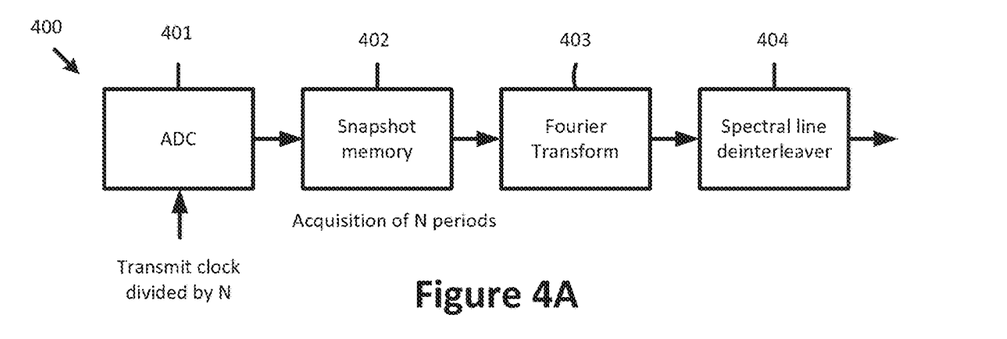
FIG. 4A illustrates a periodic signal analyzing receiver utilizing sub-sampling and involving a Fourier transform followed by deinterleaving, in accordance with embodiments.

Reference is made to FIG. 4A illustrating an embodiment (400) where the wideband sampling data converter is replaced by a sub-sampling data converter (401), thus reducing the processed signal bandwidth. According to some embodiments, at least one multiple of N periods of the signal (which was sub-sampled by a factor of N) is stored in a "snapshot" non-transitory memory (402), followed by conversion of the signal to frequency domain using for example a Fourier transform processor (403). Usually a Fast Fourier Transform (FFT) algorithm is used, but other numerical methods such as "Chirp Z-transform" (CZT) may be used. It is noted that due to aliasing, the Fourier transform coefficients (e.g. spectral lines) are permuted and should be reordered by a sprectral line deinterleaver (404) for further processing.

For example, a 1-3 GHz bandwidth would typically require a wideband ADC with 8 Gs/sec sampling rate. Assume that a waveform with a period of 10 nsec is used. Such waveform has spectral components each 100 MHz. At the 8 Gs/sec there are 80 samples per period. However, in an embodiment having a slower ADC, say ⅓ of the 8 Gs/sec, 2.666 Gs/sec, we can acquire 80 samples representing 3 periods of the waveform, perform the Fourier transform and get the resulting spectral lines. Due to aliasing, the spectral lines are a pennuted version of the original 80 spectral lines, and yet all the 80 spectral lines are discernible and can be reordered into the original order and then analyzed. It is worth noting that three periods of 10 nsec are still just 30 nsec, which meet the "real-time" notion.

Figure 4B:
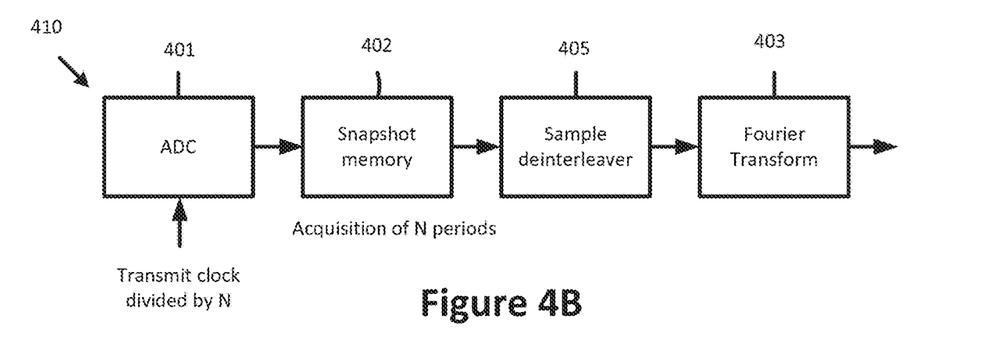
FIG. 4B illustrates a periodic signal analyzing receiver utilizing sub-sampling and involving deinterleaving time-domain samples followed by a Fourier transform, in accordance with embodiments.
Figure 4C:
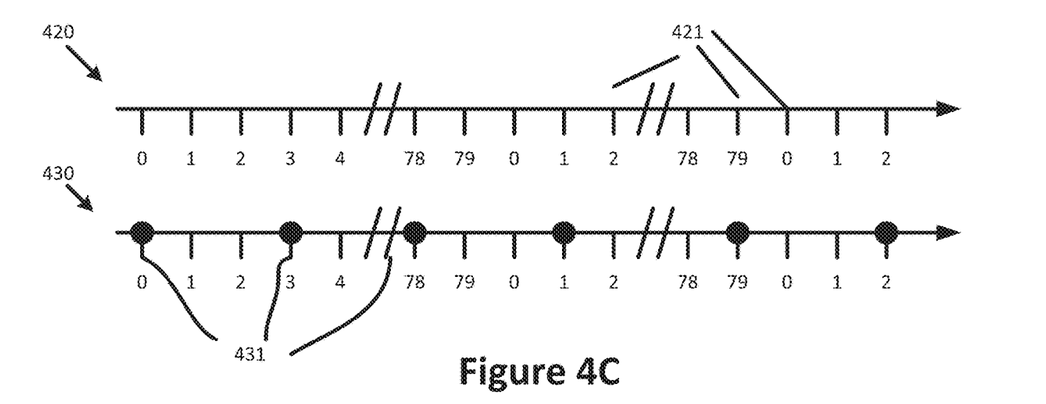
FIG. 4C illustrates the process of time sample deinterleaving, in accordance with embodiments.

Reference is made to FIG. 4B illustrating an embodiment (410) where the time domain sub-samples are deinterleaved by a sample deinterleaver (405) into an order that represents the order of the original, the not-sub-sampled signal, then converted to frequency domain for example by a Fourier transform processor (403). An example illustrating the need for deinterleaving is shown in FIG. 4C, referencing to the same waveform of 80 samples and acquiring 80 samples representing 3 periods of the waveform. The signal samples (421) at the original sampling rate (e.g. 8 Gs/sec) are schematically shown on a time line (420). By sub-sampling by a factor of 3 (e.g. 2.66 Gs/sec) we get the signals (431) in the order of 0, 3, 6 . . . 78 from the first period, 1, 4, 7 . . . 79 from the second period and 2, 5, 8 . . . 77 from the third period, schematically shown on a time line (430). The sample deinterleaver (405) output delivered to the Fourier transform processor (403) will be the samples in the proper sequential order of 0, 1, 2, 3 . . . 79.

Another method, according to some embodiments, comprises enabling the use of narrower sampling data converter to compress the bandwidth of the received signals by using a wideband signal as local oscillator (RXLO) of the receiver frequency down-converter, instead of a conventional CW local oscillator.

Figure 5A:
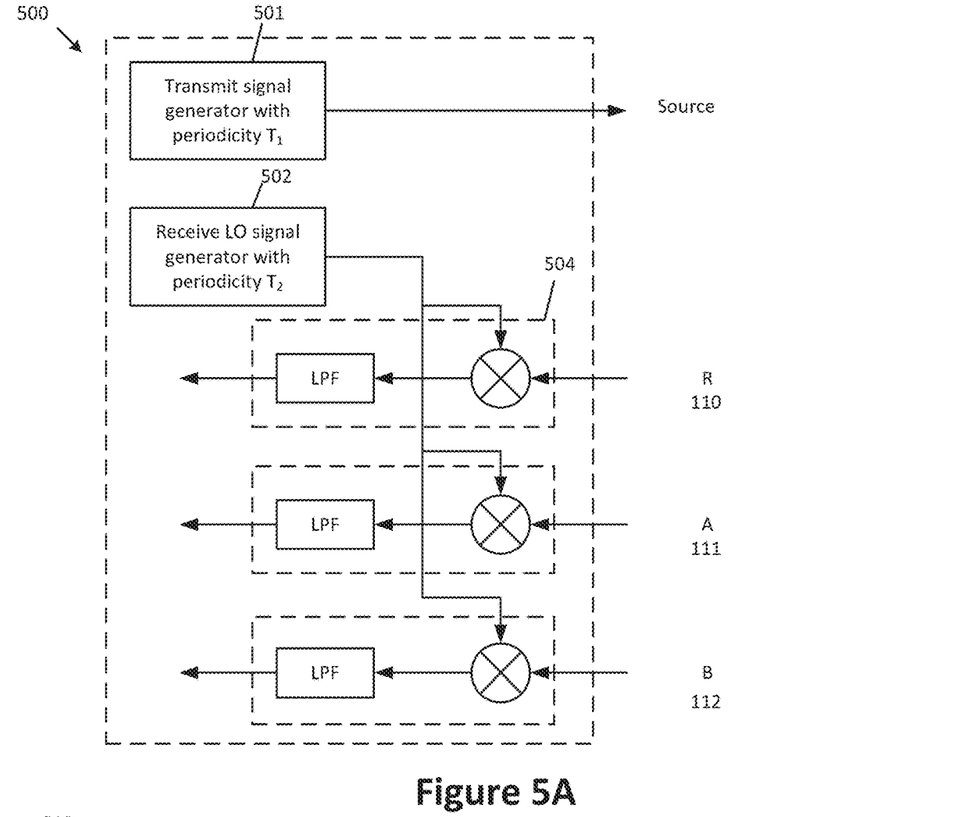
FIG. 5A illustrates a system comprising a periodic wideband transmitting source with time periodicity $T_1$ and downconversion of received signals with a periodic wideband local oscillator with time periodicity $T_2$, in accordance with embodiments.

Reference is made to FIG. 5A schematically showing a part of a network analyzer (500) of FIG. 1 comprising a transmiter (501) configured to generate a wideband signal at an appropriate frequency and with time periodicity $T_1$ and a local oscillator (502) configured to generate a wideband signal at an appropriate frequency and with time periodicity T2 for down-conversion by down-converters (504) of three received signals (110, 111, 112). The down-converters (504) according to one embodiment, include a mixer and a low-pass filter.

Figure 5B:
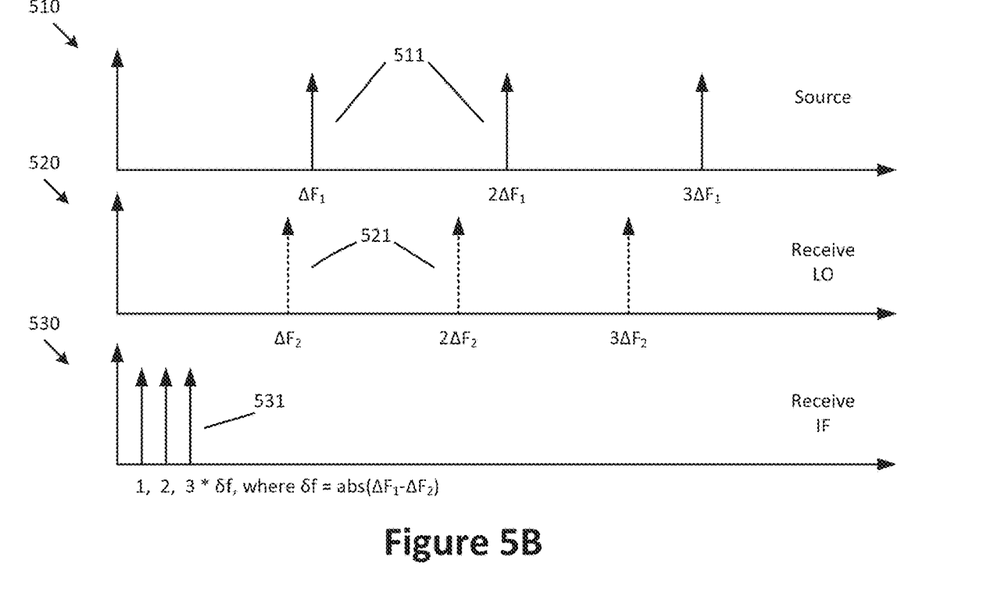
FIG. 5B illustrates the downconverted wideband periodic signal, in accordance with embodiments.

Reference is made to FIG. 5B, illustrating signals in the frequency domain. With the received signal a multi-tone "comb" at sub-carrier spacing $\Delta F_1$, where $\Delta F_1=1/T_1$, shown in graph (510), one way to do so is to use as local oscillator (RXLO) for frequency down-conversion to baseband a multi-tone comb signal with sub-carrier spacing $\Delta F_2=1/T_2$, shown in graph (520) as opposed to $\Delta F_1$ where $|\Delta F_1 - \Delta F_2|=\delta f$ and $\delta f$ is an intermediate frequency, typically much smaller than $\Delta_F$ and $\Delta F_2$. As a result, the down-converted signal shown in graph (530) is a multi-tone signal with sub-carrier spacing of $\delta f$ as opposed $\Delta F_1$ (the spacing of the original transmitted signal), the result being a bandwidth compression by a factor of $\Delta F_1/\delta f$ and as such a narrower band sampling data converter (by the same factor) can be used.

Specifically, in some cases, the transmitted signal may include a discrete comb at frequencies $f_0+\Delta F_1 \cdot n$, n=0, 1, 2 . . . (where $f_0$ is the frequency of the transmit auxiliary oscillator) and RXLO is a scaled comb with frequencies at $f_0-IF_0+(\Delta F_2) \cdot n$ (where $IF_0$ is an offset frequency—can be null, implementation dependent). After the received mixer, the resulting down-converted signal yields sub-carriers at $IF_0+n \cdot \delta f$, (or $IF_0-n \cdot \delta f$ depending of the downconversion upper side or lower side) i.e. spacing of $\delta f$ as opposed $\Delta F_1$ (the spacing of the original transmitted signal).

According to another embodiment to obtain a received baseband bandwidth compression the following method is utilized. Suppose the transmitted signal is a multi-tone comb with sub-carriers separated $\Delta F_1$ apart, i.e. $f_0+\Delta F_1 \cdot n$, n=0, 1, 2 . . . and only K of them can fit into the receiver's baseband bandwidth. This limitation is typically due to the bandwidth of the sampling data converter. The RXLO is chosen as a multi-tone comb signal with sub-carrier spacing $\Delta F_1 \cdot K - \delta f$, i.e. $f_0-IF_0+(\Delta F_1 \cdot K-\delta f) \cdot n$. The first K sub-carriers of the received signal are demodulated by the first sub-carrier of the RXLO signal, i.e. to $IF_0+m \cdot \Delta F_1$ (m=0, . . . , K−1). The next K sub-carriers are demodulated by the second RXLO sub-carrier, i.e., to $IF_0+m \cdot \Delta F_1+\delta f$ thus a shift of $\delta f$ with respect to the first set. The next K sub-carriers are demodulated by the third RXLO sub-carrier i.e. to $IF_0+m \cdot \Delta F_1+2 \cdot \delta f$ thus a shift of 2δf with respect to the first set, and so on. A similar derivation is achieved when the RXLO is chosen as a multi-tone comb signal with sub-carrier spacing $\Delta F_1 \cdot K + \delta f$.

Figure 6:
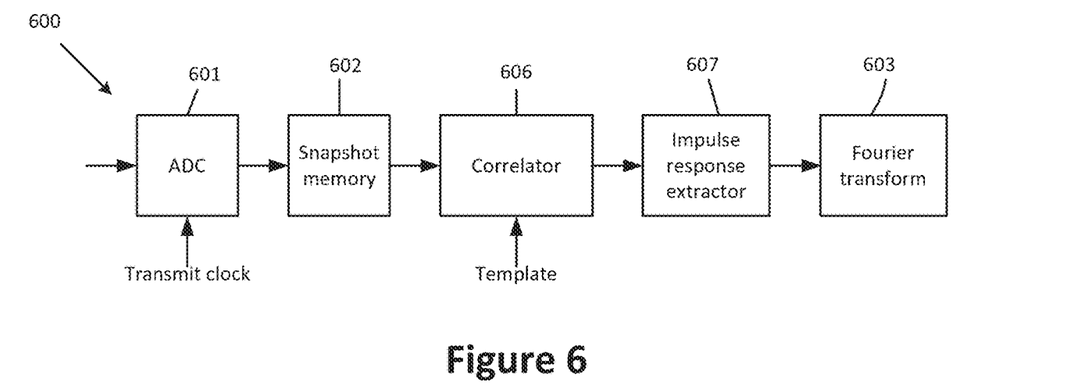
FIG. 6 shows the structure of an impulse response analyzing receiver based on transmission of a sequence and correlation with a template sequence, in accordance with embodiments.

Reference is made to FIG. 6 illustrating another method (600) of processing a received signal in accordance to embodiments. The method may include obtaining the time domain system impulse response by correlating the received signal with a template waveform selected such that the correlation between the transmitted signal waveform and the template waveform is an approximated delta-function. The received wideband signal is converted to digital data using, for example, wideband sampling data converters (601), e.g. wideband analog-to-digital converters (ADCs) and then temporarily stored in a "snapshot" non-transitory memory (602). The stored signal is correlated with a template waveform, in correlator (606) and the correlation result is fed to an impulse response extractor (607) generating the time domain impulse response of the system, which is then converted to the frequency domain using for example a Fourier transform processor (603). According to this configuration it is possible to work with nonperiodic signal waveforms or use a shorter fragment of a waveform for estimating the system response. It is noted that periodic waveforms can be used as well, using cyclic correlation for the processing.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A method for generating a frequency-up-converted periodic wideband signal, the method comprising:
   periodically reading a waveform from a digital memory in which at least one waveform is stored, wherein said periodically reading comprises reading said waveform multiple times from the digital memory;
   generating two digital signals based on the multiple read waveforms;
   converting the two digital signals by a dual digital-to-analog converter to yield two analog signals;
   antialias-filtering the two analog signals;
   up-converting the two filtered analog signals using a quadrature modulator to yield the frequency-up-converted wideband periodic signal.

2. The method of claim 1, wherein the periodically reading of the waveform is performed using an address counter.

3. The method of claim 1, wherein the up-converting of the two filtered analog signals is performed using the quadrature modulator and an oscillator to yield the frequency-up-converted wideband signal.

4. The method of cl wherein the two digital signals are in quadrature relation one to the other (I/Q).

5. A method for transmitting a signal generated according to claim 1, further comprising transmitting the frequency-up-converted wideband signal.

6. A method for downconverting a received signal with a local oscillator generated according to claim 1.

7. A device for generating a frequency-up-converted wideband periodic signal, the device comprising:
- a memory storing at least one waveform;
- a periodic address counter connected to the memory to periodically read a waveform from the memory, wherein said waveform is read multiple times from the memory, and wherein the memory generates and outputs two digital signals based on the read waveforms;
- two digital to analog converters configured to convert the two digital signals to two analog signals;
- two filters connected to said two digital to analog converters configured to anti-alias filter the two analog signals; and
- a quadrature modulator connected to said two filters and to an oscillator for generating the frequency-up-converted wideband periodic signal.

8. The device of claim 7, wherein the device is included in a transmitter.

9. The device of claim 7, wherein the device is included in a receiver.

10. The device of claim 9, wherein the receiver is included in network analyzer.

11. The device of claim 7, wherein the transmitter is included in network analyzer.

12. A network analyzer comprising a transmitter configured and operable to generate a wideband signal of claim 7.

13. A network analyzer comprising a local oscillator configured and operable to generate a wideband signal of claim 7.

* * * * *